(12) United States Patent
Ichikawa et al.

(10) Patent No.: US 10,400,142 B2
(45) Date of Patent: Sep. 3, 2019

(54) HOT MELT ADHESIVE

(71) Applicant: MORESCO CORPORATION, Hyogo (JP)

(72) Inventors: Hisashi Ichikawa, Hyogo (JP); Hiroshi Kurokawa, Hyogo (JP); Maki Samitsu, Hyogo (JP); Katsuhito Fukuda, Hyogo (JP)

(73) Assignee: MORESCO CORPORATION, Hyogo (JP)

( * ) Notice: Subject to any disclaimer, the term of this patent is extended or adjusted under 35 U.S.C. 154(b) by 321 days.

(21) Appl. No.: 15/119,833

(22) PCT Filed: Jan. 22, 2015

(86) PCT No.: PCT/JP2015/051640
§ 371 (c)(1),
(2) Date: Aug. 18, 2016

(87) PCT Pub. No.: WO2015/125546
PCT Pub. Date: Aug. 27, 2015

(65) Prior Publication Data
US 2017/0051187 A1  Feb. 23, 2017

(30) Foreign Application Priority Data
Feb. 21, 2014  (JP) .................. 2014-031504

(51) Int. Cl.
*C09J 11/08* (2006.01)
*C09J 151/00* (2006.01)
*C09J 153/02* (2006.01)

(52) U.S. Cl.
CPC ............. *C09J 11/08* (2013.01); *C09J 151/00* (2013.01); *C09J 153/02* (2013.01)

(58) Field of Classification Search
CPC ........ C09J 11/08; C09J 153/02; C09J 201/00; C09J 151/00
USPC ........................................................ 524/315
See application file for complete search history.

(56) References Cited

U.S. PATENT DOCUMENTS

| 5,441,999 A | 8/1995 | Jarvis et al. | |
| 6,214,476 B1 * | 4/2001 | Ikeda | B32B 7/12 |
| | | | 428/476.9 |
| 7,109,266 B2 * | 9/2006 | Ishiguro | C09J 7/385 |
| | | | 524/474 |
| 7,276,557 B2 * | 10/2007 | Macedo | C08F 255/00 |
| | | | 524/270 |
| 7,576,156 B2 * | 8/2009 | Ishiguro | C09J 133/04 |
| | | | 524/474 |
| 2004/0067357 A1 | 4/2004 | Engelaere | |
| 2005/0075431 A1 | 4/2005 | Haner et al. | |
| 2006/0029824 A1 * | 2/2006 | Gringoire | B32B 3/26 |
| | | | 428/522 |
| 2006/0293452 A1 | 12/2006 | Chou et al. | |
| 2007/0003722 A1 | 1/2007 | Engelaere | |
| 2007/0212504 A1 | 9/2007 | Engelaere | |
| 2009/0110925 A1 | 4/2009 | Fukuda et al. | |
| 2010/0038365 A1 * | 2/2010 | Ishida | B65D 1/165 |
| | | | 220/304 |
| 2013/0165561 A1 | 6/2013 | Kim et al. | |

FOREIGN PATENT DOCUMENTS

| CN | 1760303 | 4/2006 |
| CN | 103184020 | 7/2013 |
| JP | 2-248481 | 10/1990 |
| JP | 7-242865 | 9/1995 |
| JP | 2000-96015 | 4/2000 |
| JP | 2000-119620 | 4/2000 |
| JP | 2004-526810 | 9/2004 |
| JP | 2005-104996 | 4/2005 |
| JP | 2005-133084 | 5/2005 |
| JP | 2007-169531 | 7/2007 |
| JP | 2008-523223 | 7/2008 |
| WO | 2007/13185 | 2/2007 |

OTHER PUBLICATIONS

International Search Report dated Apr. 7, 2015 in International (PCT) Application No. PCT/JP2015/051640.
Office Action dated Apr. 19, 2017 in corresponding Chinese Application No. 201580009366.8, with English translation of Summary.
Feng et al., "Graft Modification of Petroleum Resin by MAH and Its Application in Hot Melt Adhesive", Journal of Shunde Polytechnic, 9(4):10-12 (2011), with English Abstract.

* cited by examiner

*Primary Examiner* — Jane L Stanley
(74) *Attorney, Agent, or Firm* — Wenderoth, Lind & Ponack, L.L.P.

(57) ABSTRACT

One aspect of the present invention resides in a hot melt adhesive including a thermoplastic polymer and a tackifier, wherein the tackifier includes an acid-modified tackifier that is modified by at least one of maleic acid and maleic anhydride, and by at least one selected from the group consisting of acrylic acid, methacrylic acid, an acrylic acid ester, and a methacrylic acid ester.

7 Claims, No Drawings

HOT MELT ADHESIVE

TECHNICAL FIELD

The present invention relates to a hot melt adhesive.

BACKGROUND ART

Hot melt adhesives are melted by heating and coated on adherends which are to be bonded, the adherends are then brought into contact with each other, with the melted hot melt adhesive being interposed therebetween, and held in this state, such that the adherends are bonded together. Such hot melt adhesives are used in a variety of fields, for example, in the field of packaging articles such as cardboards and small boxes, the field of sanitary materials such as disposable diapers and sanitary supplies, binding field, plywood field, woodworking field, automotive filed, field of home appliances, and field of household articles.

As mentioned hereinabove, hot melt adhesives are coated after being melted by heating. Therefore, no solvent is required therefor. For this reason, hot melt adhesives have been advantageously used, for example, in the field of sanitary materials as adhesives which are highly safe to the human body. More specifically, hot melt adhesives have been widely used for fixing and assembling constituent members in disposable sanitary materials such as disposable diapers and sanitary supplies.

When hot melt adhesives are used in the field of sanitary materials, they often come into contact with moisture, such as body fluids, due to the nature of application thereof. It is well known that in some hot melt adhesives, the adhesiveness is degraded in contact with moisture, that is, the adhesiveness is low in a wet state. Where such hot melt adhesives are used in the field where the probability of contact with moisture is high, the adhesion between the constituent materials, for example, when the products are used, cannot be maintained, and the products themselves can collapse. For this reason, it is desirable that the adhesiveness of hot melt adhesive be maintained in a wet state thereof.

For example, Patent Literature 1 to 3 disclose adhesives that have improved adhesiveness in a wet state.

Patent Literature 1 discloses an adhesive composition which includes a thermoplastic block copolymer A which is a copolymer of a vinyl aromatic hydrocarbon polymer block and an ethylene-butylene copolymer block, or a mixture of two or more such copolymers, and has at least one carboxyl group in a molecule or has an acid value of 1 or more, and a thermoplastic block copolymer B which is a copolymer of the vinyl aromatic hydrocarbon polymer block and an isoprene polymer, or a mixture of two or more such copolymers.

According to Patent Literature 1, the obtained adhesive composition has improved adhesiveness, in particular, in a wet state, with respect to fiber products such as cellulose-based products, nonwoven fabrics, and paper products, and olefin resin sheets.

Further, Patent Literature 2 discloses a hot melt adhesive including an acid-modified thermoplastic block copolymer, a tackifier resin, a plasticizing oil, and a wax.

According to Patent Literature 2, the obtained hot melt adhesive has excellent adhesiveness with respect to polyolefin resin adherends and cellulose adherends, and exhibits excellent adhesiveness within a range from immediately after bonding to after a long-term storage in both the dry state and wet state of the adherends.

Further, Patent Literature 3 discloses a hot melt adhesive including a thermoplastic block copolymer which is a copolymer of a vinyl aromatic hydrocarbon and a conjugated diene compound, and a wax modified by a carboxylic acid and/or a carboxylic acid anhydride.

According to Patent Literature 3, the obtained hot melt adhesive has improved wet adhesiveness.

In bonding methods using a hot melt adhesive, the hot melt adhesive is melted by heating. The molten hot melt adhesive is then discharged by using compressed air towards an adherend from a nozzle of a coater disposed at a certain distance from the adherend. As a result, the molten hot melt adhesive is coated in a linear shape on the adherend. Another adherend is then brought into contact with the coated hot melt adhesive, and the adherends are allowed to stay to cool and solidify the hot melt adhesive. The solidified hot melt adhesive bonds together the adherends. Further, when the hot melt adhesive is discharged from the nozzle of the coating apparatus, the extrusion direction of the hot melt adhesive is deflected, so as to coat the hot melt adhesive in a specific shape, for example, spirally, to the adherend. Such coating shape of the hot melt adhesive can be selected, as appropriate, according to the required adhesive strength or the like.

Meanwhile, in order to increase the production efficiency of products manufactured by using hot melt adhesives, it is necessary that sufficient adhesiveness between the adherends be ensured at a high rate with a small amount of a hot melt adhesive. More specifically, it is necessary that sufficient adhesiveness between the adherends be ensured even when the nozzle diameter of the coating apparatus is reduced, the flow velocity of the molten hot melt adhesive is increased, and the amount of the coated hot melt adhesive is reduced.

However, where the nozzle diameter of the coating apparatus is reduced and the flow velocity of the molten hot melt adhesive is increased, the flow of the hot melt adhesive inside the nozzle becomes unstable and uniform coating tends to be difficult to perform. In particular, where the uniformity of viscoelasticity of the hot melt adhesive decreases, the pressure or flow velocity inside the nozzle changes abruptly and the hot melt adhesive cannot be sufficiently deflected or the hot melt adhesive is scattered, thereby causing blockage, and the coating shape of the hot melt adhesive can change abruptly. Since the deterioration of coating ability, such as the abrupt variation of the coating shape, can also degraded the adhesiveness. Therefore, good coating ability needs to be ensured not only at the start of coating, but also over a long period of time. Where a hot melt adhesive is coated over a long period of time, the melted hot melt adhesive can be partially retained for a long time inside the coater. It is required that good uniformity of the hot melt adhesive be also maintained in such cases. For this reason, in order to maintain good coating ability over a long period of time, it is necessary to ensure long-term thermal stability of the hot melt adhesive, such that good uniformity is maintained, without the occurrence of accumulation of unmelted material or blockage of flow paths inside the coater.

CITATION LIST

Patent Literature

Patent Literature 1: Japanese Unexamined Patent Publication No. 2000-119620

Patent Literature 2: Japanese Unexamined Patent Publication No. 2005-104996

Patent Literature 3: Japanese Unexamined Patent Publication No. 2007-169531

SUMMARY OF INVENTION

It is an object of the present invention to provide a hot melt adhesive that excels in adhesiveness in a wet state and also in long-term thermal stability and coating ability.

One aspect of the present invention resides in a hot melt adhesive including a thermoplastic polymer and a tackifier, wherein the tackifier includes an acid-modified tackifier that is modified by at least one of maleic acid and maleic anhydride, and by at least one selected from the group consisting of acrylic acid, methacrylic acid, an acrylic acid ester, and a methacrylic acid ester.

This and other objects, features, and merits of the present invention will become apparent from the following detailed description thereof.

DESCRIPTION OF EMBODIMENTS

The research conducted by the inventors has revealed that although the adhesives disclosed in Patent Literature 1 to 3 have improved adhesiveness in a wet state, a variety of drawbacks are associated therewith.

For example, since the adhesives disclosed in Patent Literature 1 and Patent Literature 2 use an acid-modified thermoplastic block copolymer, as mentioned hereinabove, the adhesive power can be reduced. Further, such adhesives can demonstrate the degraded performance in a cold state or odor can be generated.

With the adhesive disclosed in Patent Literature 3, the adhesiveness in a wet state sometimes cannot be sufficiently improved. This is because the acid-modified wax which is the wax modified by a carboxylic acid and/or carboxylic acid anhydride has low compatibility with the thermoplastic block copolymer. Where the amount of the acid-modified wax is increased in order to improve the adhesiveness in a wet state, the uniformity of the hot melt adhesive is decreased and coating ability is degraded. For this reason, it is difficult to improve the adhesiveness in a wet state by increasing the amount of the acid-modified wax. Further, even when the acid-modified wax is added in a comparatively small amount, where the hot melt adhesive is used over a long period of time in a molten state, since the compatibility of the wax and the thermoplastic block copolymer is low, the non-uniformity of the hot melt adhesive increases in a region inside the coating apparatus where the molten hot melt adhesive can be easily retained. Further, where the amount of the acid-modified wax is increased, the sufficient effect of improving the adhesiveness in a wet state sometimes cannot be obtained under the same coating conditions as a result of the decrease in adhesive power or changes in viscosity. Thus, where the adhesive power or viscosity changes, the coating conditions need to be reevaluated each time the composition of the hot melt adhesive is changed.

Accordingly, to resolve the above-described problems, it is necessary to provide a hot melt adhesive that excels in adhesiveness in a wet state and also excels in long-term thermal stability and coating ability. The results of the comprehensive research conducted by the inventors made it clear that the abovementioned objects are attained by the present invention described hereinbelow.

The embodiments of the present invention are described hereinbelow, but the present invention is not limited thereto.

The hot melt adhesive according to the embodiment of the present invention includes a thermoplastic polymer and a tackifier. The tackifier includes an acid-modified tackifier that is modified by at least one of maleic acid and maleic anhydride (anhydrous maleic acid), and by at least one selected from the group consisting of acrylic acid, methacrylic acid, an acrylic acid ester, and a methacrylic acid ester. Thus, the hot melt adhesive according to the present embodiment includes a thermoplastic polymer and a tackifier, and the tackifier is not particularly limited, provided that it includes the acid-modified tackifier. Such a hot melt adhesive excels in adhesiveness in a wet state, long-term thermal stability, and coating ability, while exhibiting the performance that can be exhibited by the usual hot melt adhesives, for example, adhesiveness. Thus, such a hot melt adhesive exhibits sufficient performance that can be exhibited by the usual hot melt adhesives and also demonstrates excellent long-term thermal stability and coating ability, while exhibiting the increased adhesiveness in a wet state. The hot melt adhesive, as referred to herein, is an adhesive that is in a solid form (a solid) at a normal temperature, has fluidity when heated, can be coated on the objects to be bonded, such as core materials and adherends, and can be again solidified by cooling to bond the objects together.

The thermoplastic polymer which is used in the present embodiment is not particularly limited, provided it is a thermoplastic polymer that can be used as a component constituting the hot melt adhesive. Further, the thermoplastic polymer that can be used as a base polymer which is the main component of a hot melt adhesive is an example of such thermoplastic polymer. Specific examples of suitable thermoplastic polymers include elastomer-based thermoplastic polymers, olefin-based thermoplastic polymers, thermoplastic polymers based on an ethylene-vinyl acetate copolymer (EVA), polyester-based thermoplastic polymers, and polyamide-based thermoplastic polymers. Among them, in the present embodiment, elastomer-based thermoplastic polymers and olefin-based thermoplastic polymers are preferred, and elastomer-based thermoplastic polymers are more preferred.

The elastomer-based thermoplastic polymer is not particularly limited, provided that it can be used in the hot melt adhesive. Examples of such polymers include conjugated diene polymers which are polymers having a structural unit (conjugated diene unit) based on a conjugated diene compound. More specific examples of the elastomer-based thermoplastic polymers include thermoplastic block copolymers which are copolymers of a conjugated diene compound and a vinyl aromatic hydrocarbon. Such thermoplastic block copolymer can be advantageously used as the thermoplastic polymer.

The conjugated diene compounds are not particularly limited, provided they are diolefin compounds having at least a pair of conjugated double bonds. Specific examples of conjugated diene compounds include 1,3-butadiene, 2-methyl-1,3-butadiene (isoprene), 2,3-dimethyl-1,3-butadiene, 1,3-pentadiene, and 1,3-hexadiene.

The vinyl aromatic hydrocarbon is not particularly limited, provided it is an aromatic hydrocarbon having a vinyl group. Specific examples of vinyl aromatic hydrocarbons include styrene, o-methylstyrene, p-methylstyrene, p-tert-butylstyrene, 1,3-dimethylstyrene, a-methylstyrene, vinyl naphthalene, and vinyl anthracene.

The conjugated diene polymer may be of a hydrogenated type, that is, a hydrogenated conjugated diene polymer, or a non-hydrogenated type, that is, a non-hydrogenated conjugated diene polymer.

The thermoplastic polymer is preferably a thermoplastic block copolymer, and specific examples thereof include a styrene-butadiene block copolymer, a styrene-isoprene block copolymer, a hydrogenated styrene-butadiene block copolymer, and a hydrogenated a styrene-isoprene block copolymer. Those copolymers include ABA-type triblock copolymers. The styrene-butadiene block copolymer can be, for example, a styrene-butadiene-styrene block copolymer (SBS). The styrene-isoprene block copolymer can be, for example, a styrene-isoprene-styrene block copolymer (SIS). The hydrogenated styrene-butadiene block copolymer can be, for example, a styrene-ethylene-butylene-styrene block copolymer (SEBS). Further, the hydrogenated styrene-isoprene block copolymer can be, for example, a styrene-ethylene-propylene-styrene block copolymer (SEPS).

When the above-described thermoplastic block copolymer is used as the thermoplastic polymer, although excellent adhesiveness and tackiness are demonstrated, for some materials of adherends, the adhesiveness in a wet state can decrease. With the hot melt adhesive according to the present embodiment, the adhesiveness in a wet state can be increased, while maintaining other properties. Therefore, it is possible to increase the adhesiveness in a wet state, while maintaining excellent adhesiveness and tackiness inherent to the thermoplastic block copolymer. For this reason, it is preferred that the thermoplastic block copolymer be used as the thermoplastic polymer.

The olefin-based thermoplastic polymer is not particularly limited, provided that it can be used as the olefin-based thermoplastic polymer in the hot melt adhesive. For example, polymers obtained by polymerization of olefins (alkenes) such as α-olefins as monomers can be used. A propylene homopolymer is a specific examples of the olefin-based thermoplastic polymer. A more specific example is a propylene homopolymer obtained by polymerization of propylene by using a metallocene catalyst.

The EVA-based thermoplastic polymer is not particularly limited, provided that it can be used as the EVA-based thermoplastic polymer in the hot melt adhesive, and examples thereof include copolymers synthesized from ethylene and vinyl acetate.

The polyester-based thermoplastic polymer is not particularly limited, provided that it can be used as the polyester-based thermoplastic polymer in the hot melt adhesive. Examples of the polyester-based thermoplastic polymers include polyesters polymerized by using a dimer acid as a monomer.

The polyamide-based thermoplastic polymer is not particularly limited, provided that it can be used as the polyamide-based thermoplastic polymer in the hot melt adhesive, and examples thereof include polyamides.

The above-described thermoplastic polymers may be used individually or in combinations of two or more thereof as the thermoplastic polymer.

The weight-average molecular weight of thermoplastic polymers differs depending on the type of the thermoplastic polymer and is not particularly limited. For example, the molecular weight is preferably 10,000 to 500,000, more preferably 50,000 to 300,000. Where the molecular weight of the thermoplastic polymer is too low, the cohesive force and stability over time tend to decrease. Where the molecular weight of the thermoplastic polymer is too high, melt viscosity tends to increase and the coating ability tends to decrease. The weight-average molecular weight may be measured by a typical method, for example, by using gel permeation chromatography (GPC).

The tackifier according to the present embodiment includes the acid-modified tackifier. The acid-modified tackifier may be obtained by modification by a combination of at least one of maleic acid and maleic anhydride (maleic acid component) and at least one selected from the group consisting of acrylic acid, methacrylic acid, an acrylic acid ester, and a methacrylic acid ester ((meth)acrylic acid component). In addition to such a modification, modification by a carboxylic acid or carboxylic acid anhydride other than the maleic acid component and (meth)acrylic acid component may be used to obtain the acid-modified tackifier. Thus, the acid-modified tackifier is not particularly limited, provided it is obtained by modification by both the maleic acid component and the (meth)acrylic acid component.

Further, examples of acid-modified tackifiers include those obtained by modification of tackifiers which are generally used in hot melt adhesives by at least one of maleic acid and maleic anhydride, and by at least one selected from the group consisting of acrylic acid, methacrylic acid, an acrylic acid ester, and a methacrylic acid ester. More specific examples of the acid-modified tackifier include acid-modified tackifiers obtained by grafting at least one of maleic acid and maleic anhydride, and by grafting at least one selected from the group consisting of acrylic acid, methacrylic acid, an acrylic acid ester, and a methacrylic acid ester to a tackifier. When a tackifier is synthesized by polymerization, the acid-modified tackifier can be obtained by copolymerization of at least one of maleic acid and maleic anhydride and at least one selected from the group consisting of acrylic acid, methacrylic acid, an acrylic acid ester, and a methacrylic acid ester together with the monomer serving as a starting material for the tackifier.

The pre-modified tackifier in the acid-modified tackifier is not particularly limited, provided it is a tackifier generally used in hot melt adhesives. Examples of the pre-modified tackifiers include rosin-based resins, terpene-based resins, and petroleum-based resins.

Examples of the rosin-based resins include natural rosin such as gum rosin, tall rosin, and wood rosin, and also disproportionated rosin, polymerized rosin, and glycerin esters and pentaerythritol esters of these rosins. These rosin-based resins may be hydrogenated, that is, may be hydrogenation products (hydrogenates) of the rosin-based resins, or may not be hydrogenated.

Examples of the terpene-based resins include terpene resins, hydrocarbon-modified terpene resins, aromatic modified terpene resins, and phenol-based modified terpene resins. These terpene-based resins may be hydrogenated, that is, may be hydrogenation products (hydrogenates) of the terpene-based resins, or may not be hydrogenated.

Examples of the petroleum-based resins include aliphatic petroleum resins, alicyclic petroleum resins, aromatic petroleum resins, and hydrogenation products (hydrogenates) thereof.

Among the abovementioned tackifiers, the terpene-based resins and hydrogenated petroleum-based resins are preferred, and the terpene-based resins are more preferred as the pre-modified tackifier. The terpene-based resins as the pre-modified tackifier are renewable resources, excel in terms of odor and coloration, and also excel in compatibility with thermoplastic polymers. Among the aforementioned acid-modified tackifiers, the acid-modified tackifiers obtained by acid modification of terpene-based resins are preferred because of higher adhesiveness in a dry state, for example, adhesiveness to polyolefins in a dry state.

Further, hydrogenated aromatic modified terpene resins, aromatic modified terpene resins, and hydrogenated terpene resins are preferred and hydrogenated aromatic modified terpene resins are more preferred as the terpene-based resin. Thus, hydrogenated aromatic modified terpene resins, aromatic modified terpene resins, and hydrogenated terpene resins obtained by modification by at least one of maleic acid and maleic anhydride and at least one selected from the group consisting of acrylic acid, methacrylic acid, an acrylic acid ester, and a methacrylic acid ester are preferred as the acid-modified tackifier using a terpene-based resin as the pre-modified tackifier. Hydrogenated aromatic modified terpene resins obtained by modification by at least one of maleic acid and maleic anhydride and at least one selected from the group consisting of acrylic acid, methacrylic acid, an acrylic acid ester, and a methacrylic acid ester are more preferred as the acid-modified tackifier.

Hydrogenated aliphatic petroleum resins, hydrogenated alicyclic petroleum resins, and hydrogenated aromatic petroleum resins are preferred as the hydrogenated petroleum-based resins. Thus, hydrogenated aliphatic petroleum resins, hydrogenated alicyclic petroleum resins, and hydrogenated aromatic petroleum resins obtained by modification by at least one of maleic acid and maleic anhydride and at least one selected from the group consisting of acrylic acid, methacrylic acid, an acrylic acid ester, and a methacrylic acid ester are preferred as the acid-modified tackifier using a hydrogenated petroleum-based resin as the pre-modified tackifier.

The abovementioned tackifiers may be used individually or in combinations of two or more thereof as the pre-modified tackifier.

As mentioned hereinabove, at least one of maleic acid and maleic anhydride and at least one selected from the group consisting of acrylic acid, methacrylic acid, an acrylic acid ester, and a methacrylic acid ester are used as the carboxylic acid and carboxylic acid anhydride employed for acid modification.

Examples of the acrylic acid esters include methyl acrylate, ethyl acrylate, and butyl acrylate. Examples of methacrylic acid esters include methyl methacrylate, ethyl methacrylate, and butyl methacrylate.

Other carboxylic acids and carboxylic acid anhydrides may be also used as the carboxylic acids for acid modification, and those other carboxylic acids and carboxylic acid anhydrides (carboxylic acids and carboxylic acid anhydrides other than the maleic acid component and (meth)acrylic acid component) are not particularly limited.

Examples of carboxylic acids, other than maleic acid, which are used for acid modification include fumaric acid, succinic acid, phthalic acid, glutaric acid, itaconic acid, acrylic acid, and methacrylic acid.

Examples of carboxylic acid anhydrides other than maleic anhydride include anhydrous succinic acid, anhydrous phthalic acid, and anhydrous glutaric acid.

The acid-modified tackifier is not particularly limited, provided it has the abovementioned configuration. A specific example of the acid-modified tackifier is a compound represented by Formula (1) below. The compound represented by Formula (1) may have a repeating unit represented by Formula (1) and may be, for example, a random copolymer or a block copolymer. It is preferred that the compound represented by Formula (1) be a random copolymer having a repeating unit represented by Formula (1).

[C1]

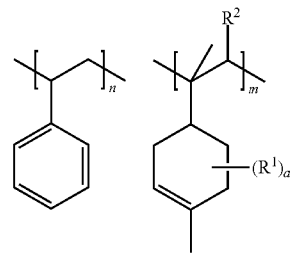

(1)

In Formula (1), "$R^1$" and "$R^2$" are independently a hydrogen atom or a functional group represented by Formula (2) below. Also, "a" represents the degree of substitution of "$R^1$" and is 0 to 3, preferably 0 or 1. At least one among a plurality of "$R^1$" and "$R^2$" is the functional group represented by Formula (2) below. Further, "m" and "n" represent the degree of polymerization; "n" is not particularly limited, provided that the ratio thereof in the total of "n" and "m" is from 0 or more to less than 1. The weight-average molecular weight of the compound represented by Formula (1) is preferably 100 to 10,000, more preferably 300 to 4,000. Thus, "n" and "m" are preferably the degrees of polymerization such that the weight-average molecular weight is within the abovementioned ranges. The weight-average molecular weight can be measured by typical molecular weight measurements, for example, by gel permeation chromatography (GPC). Moreover, the functional group represented by Formula (2) may have a repeating unit represented by Formula (2) and may be, for example, a functional group configured of a random copolymer or a functional group configured of a block copolymer. The functional group represented by Formula (2) may be configured of a random copolymer having a repeating unit represented by Formula (2). Further, "$R^3$" and "$R^4$" in Formula (2) are independently a hydrogen atom or a functional group. Examples of the functional group include a methyl group, an ethyl group, and a butyl group. Also, "l" and "k" represent the degree of polymerization and are not particularly limited, provided that each is 1 or more. The functional group represented by Formula (2) preferably has a degree of polymerization such that the weight-average molecular weight of the compound represented by Formula (1) is within the abovementioned ranges. The number of the functional groups represented by Formula (2) is 1 or more in one molecule of the compound represented by Formula (1).

[C2]

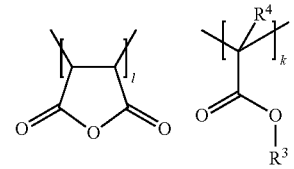

(2)

A method for manufacturing the acid-modified tackifier is not particularly limited, provided that an acid-modified tackifier can be manufactured which is modified by at least one of maleic acid and maleic anhydride, and by at least one selected from the group consisting of acrylic acid, methacrylic acid, an acrylic acid ester, and a methacrylic acid ester. In a specific example of the method for manufacturing an acid-modified tackifier, both the at least one of maleic acid and maleic anhydride and the at least one selected from the group consisting of acrylic acid, methacrylic acid, an acrylic acid ester, and a methacrylic acid ester are added to the melt of a tackifier serving as a starting material and an addition reaction is conducted. When the addition reaction is conducted, a radical generating agent may be used. Another specific method for manufacturing an acid-modified tackifier includes heating and melting a tackifier serving as a starting material, a radical generating agent, at least one of maleic acid and maleic anhydride, and at least one selected from the group consisting of acrylic acid, methacrylic acid, an acrylic acid ester, and a methacrylic acid ester and mixing the melt, thereby conducting an addition reaction. In this case, the temperature at which the tackifier can be melted may be the selected as the temperature at the time of mixing the melt. This temperature is, for example, 160° C. to 200° C. An apparatus for realizing the method is not particularly limited, provided that the started materials can be melted and mixed. For example, a stirring kneader, a roll, a Banbury mixer, a kneader, and an extruder equipped with a heating device, can be used as the apparatus.

A radical generating agent which is to be used in the addition reaction is not particularly limited, provided that the agent can promote the addition reaction, and a well-known radical generating agent can be selected as appropriate. For example, organic peroxide compounds can be used as the radical generating agent. Examples of the organic peroxide compounds include: di-tert-butyl peroxide, dicumyl peroxide, tert-butyl cumyl peroxide, benzoyl peroxide, dilauryl peroxide, cumene hydroperoxide, tert-butyl hydroperoxide, 1,1-bis(tert-butylperoxy)-3,5,5-trimethylcyclohexane, 2,5-dimethyl-2,5-di(tert-butylperoxy)hexane, 1,1-bis(tert-butylperoxy)-cyclohexane, cyclohexanone peroxide, tert-butyl peroxybenzoate, tert-butylperoxy isobutyrate, tert-butylperoxy-3,5,5-trimethylhexanoate, tert-butylperoxy-2-ethylhexanoate, tert-butylperoxy isopropyl carbonate, and cumyl peroxyoctoate. Among them, dicumyl peroxide is preferred.

The amount of the radical generating agent added is not particularly limited, provided that the addition reaction can be advantageously advanced. The amount of the radical generating agent added is preferably 1 mass % to 50 mass %, more preferably 10 mass % to 30 mass % on the basis of the total mass of the carboxylic acid and carboxylic acid anhydride. By setting the amount of the radical generating agent added within the abovementioned ranges, it is possible to induce the addition reaction to the main chain, while suppressing the decrease in the molecular weight of the acid-modified tackifier.

The tackifier used in the present embodiment may include the acid-modified tackifier, or may be configured of the acid-modified tackifier, or may also include a tackifier other than the acid-modified tackifier. Thus, the tackifier may include the acid-modified tackifier and a tackifier which is not modified by an acid.

The tackifier which is not modified by an acid is not particularly limited and can be, for example, the same as the tackifier before the modification.

The amount of acid-modified tackifier is not particularly limited, provided it is within a range in which the desirable properties, which are the objects of the present invention, are not degraded. The amount of acid-modified tackifier is preferably 0.1 mass % to 100 mass %, more preferably 1 mass % to 50 mass %, even more preferably 1 mass % to 20 mass % on the basis of the total weight of the tackifier, that is, the total weight of the acid-modified tackifier and the tackifier which is not modified by an acid. Where the amount of the acid-modified tackifier is too low, the effect resulting from the inclusion of the acid-modified tackifier cannot be sufficiently demonstrated and the adhesiveness in a wet state tends not to increase sufficiently. Further, the effect of the present invention can be sufficiently demonstrated even when the amount of the acid-modified tackifier is increased. However, where the amount of the acid-modified tackifier is higher than that necessary to ensure wet adhesiveness, cost efficiency is decreased.

It is preferred that the hot melt adhesive according to the present embodiment further include a softener. The softener used in the present embodiment is not particularly limited, provided that it is a softener which is generally used in hot melt adhesives. Examples of the softener include paraffin oils such as liquid paraffin, naphthenic oil, and aromatic oil. Such softeners may be used individually or in combinations of two or more thereof.

The amounts of the thermoplastic polymer, the tackifier, and the softener in the hot melt adhesive are not particularly limited, provided that they are within ranges in which the desired properties, which are the objects of the present invention, are not degraded. For example, these amounts can be within the following ranges.

The amount of the thermoplastic polymer is preferably 10 mass % to 75 mass %, more preferably 15 mass % to 65 mass %, even more preferably 15 mass % to 30 mass % on the basis of the total mass of the thermoplastic polymer, the tackifier, and the softener. Where the amount of the thermoplastic polymer is too small, the cohesive force tends to be insufficient. Further, where the amount of the thermoplastic polymer is too large, the melt viscosity tends to rise and the coating ability tends to decrease. This amount is based on the total amount of the hot melt adhesive.

The amount of the tackifier is preferably 20 mass % to 80 mass %, preferably 35 mass % to 70 mass %, more preferably 40 mass % to 70 mass % on the basis of the total amount. Where the amount of the tackifier is too small, the adhesive power and adhesive strength tend to decrease. Where the amount of the tackifier is too large, softness and flexibility are lost and stress dispersibility and holding force tend to decrease. The amount referred to herein is based on the total of the hot melt adhesive.

Where the softener is contained, the amount thereof is preferably 5 mass % to 40 mass %, more preferably 10 mass % to 25 mass %, even more preferably 15 mass % to 25 mass % based on the total mass. Where the amount of the softener is too small, the melt viscosity tends to increase and coating ability tends to decrease. Where the amount of the softener is too large, the cohesive force, adhesive power, and holding force tend to decrease. The amount referred to herein is based on the total of the hot melt adhesive.

It follows from the above, that the amount of the thermoplastic polymer in the hot melt adhesive is preferably 10 mass % to 75 mass % based on the total amount of the hot melt adhesive, and the amount of the tackifier is preferably 20 mass % to 80 mass % based on the total amount of the hot melt adhesive. Further, where the softener is included in the hot melt adhesive, the amount of the softener is preferably 5 mass % to 40 mass % based on the total mass.

The hot melt adhesive according to the present embodiment may also include components other than the thermoplastic polymer, the tackifier, and the softener within ranges in which the desired properties, which are the objects of the present invention are not degraded. More specifically, additives such as antioxidants, heat stabilizers, light stabilizers, ultraviolet absorbers, fillers, surfactants, coupling agents, colorants, antistatic agents, flame retardants, waxes and plasticizer may be included.

Examples of the antioxidants include phenolic antioxidants and organic sulfur antioxidants. Examples of the phenolic antioxidants include 2,6-di-tert-butyl-4-methylphenol, n-octadecyl-3-(3,5-di-tert-butyl-4-hydroxyphenyl)propionate, 2-tert-butyl-6-(3-tert-butyl-2-hydroxy-5-methylbenzyl)-4-methylphenyl acrylate, and tetrakis[methylene-3-(3,5-di-tert-butyl-4-hydroxyphenyl)propionate]methane. Examples of the organic sulfur antioxidants include dilauryl-3,3'-thiodipropionate, dimyristyl-3,3'-thiodipropionate, distearyl-3,3'-thiodipropionate, and pentaerithrityl tetrakis(3-laurylthiopropionate). These antioxidants may be used individually or in combinations of two or more thereof.

The wax is not particularly limited, provided it can be included in the hot melt adhesive. Examples of suitable waxes include synthetic waxes, petroleum waxes, and natural waxes. Examples of the synthetic waxes include polyolefin waxes such as Fischer-Tropsch wax, polyethylene wax, and polypropylene wax. Examples of the petroleum waxes include paraffin waxes, microcrystalline waxes, and petrolatum. Examples of the natural waxes include montan wax, Japanese wax, carnauba wax, beeswax, and castor wax. These waxes may be used individually or in combinations of two or more thereof.

A method for manufacturing the hot melt adhesive according to the present embodiment is not particularly limited, provided that the hot melt adhesive of the above-mentioned configuration can be manufactured. For example, the hot melt adhesive can be manufactured by heating, melting, stirring, and kneading the components constituting the hot melt adhesive. As a result, it is possible obtain a hot melt adhesive with a high dispersivity of the components constituting the hot melt adhesive. Examples of apparatuses for realizing the method include a stirring kneader, a roll, a Banbury mixer, a kneader, and an extruder equipped with a heating device.

A bonding method using the hot melt adhesive is not particularly limited, provided that it can be employed as a bonding method using the hot melt adhesive. For example, a bonding method using the hot melt adhesive includes melting the hot melt adhesive by heating. The molten hot melt adhesive is then coated on an adherend which is a bonding object. Another adherend is then brought into contact with the coated hot melt adhesive, and the adherends are allowed to stay to cool and solidify the hot melt adhesive. The solidified hot melt adhesive bonds together the adherends.

A method for coating the hot melt adhesive is not particularly limited, provided that the hot melt adhesive can be advantageously coated. The coating methods can be generally classified into, for example, contact coating methods and contactless coating methods. In the contact coating method, when the hot melt adhesive is coated, an apparatus used for coating, such as a coater, is brought into contact with the adherend. In the contactless coating methods, when the hot melt adhesive is coated, an apparatus used for coating, such as a coater, is not in contact with the adherend. The contact coating method is realized, for example, by slot coating (for example, a slot coating gun manufactured by Nordson KK) and roll coater coating. The contactless coating method can be realized, for example, by spiral coating that enables coating in a spiral shape (for example, a spiral spray nozzle manufactured by Suntool Co.), spray coating that enables wavy coating (for example, Omega coater manufactured by ITW Dynatec KK), spray coating that enables planar coating (for example, a curtain spray head manufactured by Suntool Co.), and dot coating that enables dot-like coating. The hot melt adhesive according to the present embodiment is suitable for spiral coating. The spiral coating as referred to herein is a method in which an adhesive is spirally coated by air in a contactless manner in an intermittent or continuous mode.

As mentioned hereinabove, the present specification discloses a variety of techniques, and the main among them is summarized hereinbelow.

One aspect of the present invention resides in a hot melt adhesive including a thermoplastic polymer and a tackifier, wherein the tackifier includes an acid-modified tackifier that is modified by at least one of maleic acid and maleic anhydride, and by at least one selected from the group consisting of acrylic acid, methacrylic acid, an acrylic acid ester, and a methacrylic acid ester.

With such a configuration, it is possible to obtain a hot melt adhesive that excels in adhesiveness in a wet state and also in long-term thermal stability and coating ability.

It is preferred that the acid-modified tackifier in the hot melt adhesive be a terpene-based resin modified by at least one of maleic acid and maleic anhydride, and by at least one selected from the group consisting of acrylic acid, methacrylic acid, an acrylic acid ester, and a methacrylic acid ester.

With such a configuration, it is possible to obtain a hot melt adhesive that excels in adhesiveness in a wet state, long-term thermal stability, and coating ability to even a greater extent.

It is more preferred that the pre-modified terpene-based resin in the acid-modified tackifier be at least one selected from the group consisting of a hydrogenated aromatic modified terpene resin, an aromatic modified terpene resin, and a hydrogenated terpene resin. Thus, it is more preferred that the acid-modified tackifier be at least one selected from the group consisting of a hydrogenated aromatic modified terpene resin, an aromatic modified terpene resin, and a hydrogenated terpene resin which have been modified by at least one of a carboxylic acid and carboxylic acid anhydride.

With such a configuration, it is possible to obtain a hot melt adhesive that excels in adhesiveness in a wet state and also in long-term thermal stability and coating ability.

It is also preferred that the acid-modified tackifier in the hot melt adhesive be a hydrogenated petroleum-based resin modified by at least one of maleic acid and maleic anhydride, and by at least one selected from the group consisting of acrylic acid, methacrylic acid, an acrylic acid ester, and a methacrylic acid ester.

With such a configuration, it is possible to obtain a hot melt adhesive that excels in adhesiveness in a wet state and also in long-term thermal stability and coating ability.

Further, in the hot melt adhesive, it is preferred that the pre-modified hydrogenated petroleum-based resin in the acid-modified tackifier be at least one selected from the group consisting of a hydrogenated aliphatic petroleum resin, a hydrogenated alicyclic petroleum resin, and a hydrogenated aromatic petroleum resins. Thus, it is more preferred that the acid-modified tackifier be at least one selected from the group consisting of a hydrogenated aliphatic petroleum resin, a hydrogenated alicyclic petroleum resin, and a hydrogenated aromatic petroleum resin which have been modified by at least one of a carboxylic acid and carboxylic acid anhydride.

With such a configuration, it is possible to obtain a hot melt adhesive that excels in adhesiveness in a wet state and also in long-term thermal stability and coating ability.

It is also preferred that the thermoplastic polymer in the hot melt adhesive be a copolymer of a conjugated diene compound and a vinyl aromatic hydrocarbon.

A hot melt adhesive including, as the thermoplastic polymer, a thermoplastic block copolymer which is a copolymer of a conjugated diene compound and a vinyl aromatic hydrocarbon demonstrates excellent adhesiveness and tackiness, but for some materials of adherends, the adhesiveness in a wet state can decrease. With the above-described configuration, that is, with the hot melt adhesive including the acid-modified tackifier, it is possible to obtain a hot melt adhesive that excels not only in adhesiveness in a wet state, but also in adhesiveness in a dry state, tackiness, long-term thermal stability, and coating ability even when the thermoplastic block copolymer is included.

It is also preferred that the copolymer in the hot melt adhesive be at least one selected from the group consisting of a styrene-butadiene block copolymer, a styrene-isoprene block copolymer, a hydrogenated styrene-butadiene block copolymer, and a hydrogenated styrene-isoprene block copolymer.

With the above-described configuration, it is possible to obtain a hot melt adhesive that excels not only in adhesiveness in a wet state, but also in adhesiveness in a dry state, tackiness, long-term thermal stability and coating ability.

It is also preferred that the amount of the acid-modified tackifier in the hot melt adhesive be 0.1 mass % to 100 mass % based on the total amount of the tackifier.

With such a configuration, the effect of increasing the adhesiveness in a wet state which is due to the inclusion of the acid-modified tackifier can be demonstrated to an even greater extent. Thus, it is possible to obtain a hot melt adhesive that excels in adhesiveness in a wet state, long-term thermal stability and coating ability to a greater extent.

In the hot melt adhesive, the amount of the thermoplastic polymer is preferably 10 mass % to 75 mass % and the amount of the tackifier is preferably 20 mass % to 80 mass %.

It is also preferred that the hot melt adhesive further include a softener.

With such a configuration, it is possible to obtain a hot melt adhesive that excels in adhesiveness in a wet state to a greater extent while also excelling in long-term thermal stability and coating ability.

When the softener is included in the hot melt adhesive, the amount of the softener is preferably 5 mass % to 40 mass %.

With such a configuration, it is possible to obtain a hot melt adhesive that excels in adhesiveness in a wet state, long-term thermal stability, and coating ability to a greater extent.

The present invention will be explained hereinbelow in greater detail by examples thereof, but the scope of the present invention is not limited to these examples.

EXAMPLES

Initially, acid-modified tackifiers that are used in examples and comparative examples will be explained.

Acid-Modified Tackifiers

Manufacturing Example 1: Acid-Modified Tackifier 1

A total of 750 g of a hydrogenated aromatic modified terpene resin (CLEARON K4100, manufactured by YASU-HARA CHEMICAL CO., LTD.: softening point 100° C.) was loaded into a stainless steel (SUS) reaction kettle and melted at 170° C. A nitrogen atmosphere was then created in the reaction kettle and 22.5 g of anhydrous maleic acid, 5 g of dicumyl peroxide, and 22.5 g of butyl methacrylate were dropped for 1 h into the melt in the reaction kettle. After the dropping was completed, stirring was conducted for 30 min at 170° C., and the reaction kettle was then depressurized, thereby removing, over 1 h, the unreacted matter and low-molecular compounds produced by the decomposition of dicumyl peroxide. As a result, a light-yellow solid matter was obtained. This solid matter was a hydrogenated aromatic modified terpene resin modified by anhydrous maleic acid and butyl methacrylate (acid-modified tackifier 1). The obtained acid-modified tackifier 1 had a melt viscosity of 3500 mPa·s at 140° C. and a weight-average molecular weight of 1,260.

Manufacturing Example 2: Acid-Modified Tackifier 2

An acid-modified tackifier 2 was manufactured in the same manner as in Manufacturing Example 1, except that a hydrogenated terpene resin (CLEARON P115, manufactured by YASUHARA CHEMICAL CO., LTD.: softening point 115° C.) was used instead of the hydrogenated aromatic modified terpene resin. The acid-modified tackifier 2 was a hydrogenated terpene resin modified by anhydrous maleic acid and butyl methacrylate. The obtained acid-modified tackifier 2 had a melt viscosity of 3,200 mPa·s at 140° C. and a weight-average molecular weight of 1,120.

Manufacturing Example 3: Acid-Modified Tackifier 3

An acid-modified tackifier 3 was manufactured in the same manner as in Manufacturing Example 1, except that a hydrogenated alicyclic petroleum resin (ARKON M-100, manufactured by Arakawa Chemical Industries, Ltd.: softening point 100° C.) was used instead of the hydrogenated aromatic modified terpene resin. The acid-modified tackifier 3 was a hydrogenated alicyclic petroleum resin modified by anhydrous maleic acid and butyl methacrylate. The obtained acid-modified tackifier 3 had a melt viscosity of 3,700 mPa·s at 140° C. and a weight-average molecular weight of 1,170.

Manufacturing Example 4: Acid-Modified Tackifier 4

An acid-modified tackifier 4 was manufactured in the same manner as in Manufacturing Example 1, except that a hydrogenated aromatic petroleum resin (Regalite S5100, manufactured by Eastman Chemical Company: softening point 100° C.) was used instead of the hydrogenated aromatic modified terpene resin. The acid-modified tackifier 4 was a hydrogenated aromatic petroleum resin modified by anhydrous maleic acid and butyl methacrylate. The obtained acid-modified tackifier 4 had a melt viscosity of 1,990 mPa·s at 140° C. and a weight-average molecular weight of 990.

Manufacturing Example 5: Acid-Modified Tackifier 5

An acid-modified tackifier 5 was manufactured in the same manner as in Manufacturing Example 1, except that a hydrogenated aliphatic petroleum resin (Eastotac C-100R, manufactured by Eastman Chemical Company: softening point 100° C.) was used instead of the hydrogenated aromatic modified terpene resin. The acid-modified tackifier 5 was a hydrogenated aliphatic petroleum resin modified by anhydrous maleic acid and butyl methacrylate. The obtained acid-modified tackifier 5 had a melt viscosity of 2,630 mPa·s at 140° C. and a weight-average molecular weight of 1,000.

Manufacturing Example 6: Acid-Modified Tackifier 6

An acid-modified tackifier 6 was manufactured in the same manner as in Manufacturing Example 1, except that butyl methacrylate was not added. The acid-modified tackifier 6 was a hydrogenated aromatic modified terpene resin modified by anhydrous maleic acid. The obtained acid-modified tackifier 6 was not modified by the (meth)acrylic acid component and had a melt viscosity of 3,500 mPa·s at 140° C. and a weight-average molecular weight of 1,240.

Manufacturing Example 7: Acid-Modified Tackifier 7

An acid-modified tackifier 7 was manufactured in the same manner as in Manufacturing Example 6, except that a hydrogenated aromatic petroleum resin (Regalite S5100, manufactured by Eastman Chemical Company: softening point 100° C.) was used instead of the hydrogenated aromatic modified terpene resin. The acid-modified tackifier 7 was a hydrogenated aromatic petroleum resin modified by anhydrous maleic acid. The obtained acid-modified tackifier 7 was not modified by the (meth)acrylic acid component and had a melt viscosity of 1,980 mPa·s at 140° C. and a weight-average molecular weight of 980.

The components constituting the hot melt adhesive will be described hereinbelow.

[Thermoplastic Polymer]

Thermoplastic polymer 1: styrene-butadiene-styrene block copolymer (SBS) (Asaprene T-436, manufactured by Asahi-kasei Chemicals Corporation)

Thermoplastic polymer 2: styrene-isoprene-styrene block copolymer (SIS) (Quintac 3421, manufactured by ZEON CORPORATION)

Thermoplastic polymer 3: amorphous poly-α-olefin polymer (VESTOPLAST 704, manufactured by Evonik Industries AG)

[Tackifier]

Tackifier 1: hydrogenated aromatic modified terpene resin (CLEARON K4100, manufactured by YASUHARA CHEMICAL CO., LTD.)

Tackifier 2: hydrogenated aromatic modified terpene resin (CLEARON P115, manufactured by YASUHARA CHEMICAL CO., LTD.)

Tackifier 3: hydrogenated alicyclic petroleum resin (ARKON M-100, manufactured by Arakawa Chemical Industries, Ltd.)

Tackifier 4: hydrogenated aromatic petroleum resin (Regalite S5100, manufactured by Eastman Chemical Company)

Tackifier 5: hydrogenated aliphatic petroleum resin (Eastotac C-100R, manufactured by Eastman Chemical Company)

Acid-modified tackifier 1: acid-modified tackifier manufactured in Manufacturing Example 1 (hydrogenated aromatic modified terpene resin modified by anhydrous maleic acid and butyl methacrylate)

Acid-modified tackifier 2: acid-modified tackifier manufactured in Manufacturing Example 2 (hydrogenated terpene resin modified by anhydrous maleic acid and butyl methacrylate)

Acid-modified tackifier 3: acid-modified tackifier manufactured in Manufacturing Example 3 (hydrogenated alicyclic petroleum resin modified by anhydrous maleic acid and butyl methacrylate)

Acid-modified tackifier 4: acid-modified tackifier manufactured in Manufacturing Example 4 (hydrogenated aromatic petroleum resin modified by anhydrous maleic acid and butyl methacrylate)

Acid-modified tackifier 5: acid-modified tackifier manufactured in Manufacturing Example 5 (hydrogenated aliphatic petroleum resin modified by anhydrous maleic acid and butyl methacrylate)

Acid-modified tackifier 6: acid-modified tackifier manufactured in Manufacturing Example 6 (hydrogenated aromatic modified terpene resin modified by anhydrous maleic acid)

Acid-modified tackifier 7: acid-modified tackifier manufactured in Manufacturing Example 7 (hydrogenated aromatic petroleum resin modified by anhydrous maleic acid)

[Softener]

Softener 1: oil (Diana Fresia S32, manufactured by Idemitsu Kosan Co., Ltd.)

Softener 2: liquid paraffin (MORESCO WHITE P-200, manufactured by MORESCO Corporation)

[Additives]

Antioxidant 1: Irganox 1010, manufactured by BASF SE

Antioxidant 2: Irgafos 168, manufactured by BASF SE

Acid-modified wax 1: polypropylene modified by anhydrous maleic acid (UMEX 1010, manufactured by Sanyo Chemical Industries, Ltd.)

Acid-modified wax 2: polypropylene modified by anhydrous maleic acid (LICOCENE PP MA 6252, manufactured by Clariant (Japan) K.K.)

[Method for Manufacturing Hot Melt Adhesive]

The hot melt adhesives were produced by kneading in the following sequence to obtain the compounded amounts (composition: parts by mass) presented in Tables 1 and 2 below. The tackifier other than the acid-modified tackifier, the softener and additives were charged into a stirring kneader and sufficiently melted by stirring under heating to a temperature of 150° C. to 190° C. The thermoplastic polymer was charged into the melt and kneaded under heating to a temperature of 150° C. to 190° C. As a result, the thermoplastic polymer was sufficiently melted and uniformly dispersed in the melt. The acid-modified tackifier was then charged into the melt and stirring-kneading were performed. At this time, the kneading was performed such as to increase the uniformity of the hot melt adhesive as much as possible. The hot melt adhesives were thus manufactured.

[Evaluation]

(Uniformity)

The manufactured hot melt adhesives were visually checked. Where no non-uniform portion could be confirmed, the evaluation was "O". Where a non-uniform portion could be confirmed, but the adhesive could be coated with a slot die coater (Mirror Coater, manufactured by Suntool Co.), the evaluation was "Δ". Where the coating with the slot-die coater was determined to be impossible, the evaluation was "x". Where the coating with the slot-die coater is impossible, it means that the hot melt adhesive is extremely non-uniform.

(Long-Term Thermal Stability)

The manufactured hot melt adhesive was stored for 5 days in a stationary state in a thermostat held at 140° C. The hot melt adhesive stored under the high temperature was visually checked. The evaluation was performed on the basis of the same criteria as were used for the uniformity.

(Coating Ability)

The manufactured hot melt adhesive was spirally coated on a nonwoven fabric (metric weight 20 g/m$^2$) at an air pressure of 0.30 kgf/cm$^2$ (about 30 kPa) and a coating speed of 200 m/min by using a coater (a tension coater manufactured by ZUIKO CO., LTD.) equipped with a nozzle head (a spiral gun, manufactured by Suntool Co.). Random sections of 10 cm were extracted from the spiral coating pattern which was coated on the nonwoven fabric, and the evaluation was performed on the following criteria based on the number of turns in the spiral and the diameter of the spiral in this range. The number of turns in the spiral and the diameter of the spiral in the case of using the hot melt adhesive of Comparative Example 1 below, in which acid-modified materials such as the acid-modified tackifier and acid-modified wax were not added served as target values in terms of coating ability. The evaluation was performed according to the following criteria with respect to these target values.

As a result, where the number of turns in the spiral and the diameter of the spiral were each 90% or more of the target value, the evaluation was "O". Where the number of turns in the spiral or the diameter of the spiral was less than 90% of the target value, the evaluation was "Δ". Where the number of turns in the spiral and the diameter of the spiral were each less than 90% of the target value, the evaluation was "x". The case of "x" evaluation is inclusive of the case in which the hot melt adhesive was scattered during the coating and the spiral coating pattern could not be formed, the case in which the nozzle was clogged, and the case in which the spread in the diameter of the spiral in random 10 cm section of the spiral coating pattern was 20% or more.

The coating conditions can be easily set by the settings of the coater when the ratio to the target value is within ±10%, and the adjustment is difficult when the ratio is more than ±20%. For this reason, where the evaluation is "O", the coating ability can be adjusted to a good state.

(Adhesiveness in a Wet State: Wet Adhesive Strength)

The obtained hot melt adhesive was coated with a slot die coater (Mirror Coater, manufactured by Suntool Co.) to a thickness of 10 μm on a polyethylene terephthalate (PET) film with a thickness of 50 μm, and a transparent color cellophane with a thickness of 0.018 mm was placed on the hot melt adhesive. The cellophane was then bonded by using a 2-kg roller at a rate of 300 mm/min and then allowed to stay for 24 h at normal temperature. The bonded configuration was taken as a testpiece. Three testpieces for each hot melt adhesive were prepared. The testpieces were then dipped into water for 30 s, and the strength at the time of peeling at a rate of 300 mm/min was then measured. The strength was measured for three testpieces, and the average of the three measurement values was calculated. This average value was taken as the adhesive strength in a wet state (wet adhesive strength), and the adhesiveness in a wet state was evaluated by this strength.

The cases in which the coating ability was too poor and the evaluation could not be performed are denoted by "-" in Table 1 below.

(Adhesiveness to Polyethylene: Dry Adhesive Strength)

The obtained hot melt adhesive was coated with a slot die coater (Mirror Coater, manufactured by Suntool Co.) to a thickness of 10 μm on a PET film with a thickness of 50 μm. The PET film on which the hot melt adhesive was coated was placed on a polyethylene (PE) sheet (manufactured by T.P GIKEN) with a thickness of 3 mm such that the hot melt adhesive was in contact with the PE sheet. Bonding was then performed by using a 2-kg roller at a rate of 300 mm/min, and the bonded configuration was allowed to stay for 24 h at normal temperature. The bonded configuration was taken as a testpiece. Three testpieces for each hot melt adhesive were prepared. The strength of the testpieces at the time of peeling at a rate of 300 mm/min was then measured. The strength was measured for three testpieces, and the average of the three measurement values was calculated. This average value was taken as the adhesive strength with polyethylene in a dry state (dry adhesive strength), and the adhesiveness in a dry state was evaluated by this strength.

The cases in which the coating ability was too poor and the evaluation could not be performed are denoted by "-" in Table 1 below.

The evaluation results are shown together with the compounded amounts of the hot melt adhesives in Tables 1 to 3.

TABLE 1

| | | Examples | | | | | | | Comparative Examples | | | | |
|---|---|---|---|---|---|---|---|---|---|---|---|---|---|
| | | 2 | 3 | 4 | 5 | 6 | 7 | 1 | 2 | 3 | 4 | 5 |
| Composition (parts by mass) | Thermoplastic polymer 1 | 20 | 20 | 20 | 20 | 20 | 20 | 20 | 20 | 20 | 20 | 20 | 20 |
| | Tackifier 1 | 57 | 55 | 52 | 50 | 30 | 59.9 | — | 60 | 57 | 50 | 50 | 30 |
| | Acid-modified tackifier 1 | 3 | 5 | 8 | 10 | 30 | 0.1 | 60 | — | — | — | — | — |
| | Softener 1 | 20 | 20 | 20 | 20 | 20 | 20 | 20 | 20 | 20 | 20 | 20 | 20 |
| | Acid-modified wax 1 | — | — | — | — | — | — | — | — | 3 | 10 | — | — |
| | Acid-modified wax 2 | — | — | — | — | — | — | — | — | — | — | 10 | 30 |
| | Antioxidant 1 | 0.5 | 0.5 | 0.5 | 0.5 | 0.5 | 0.5 | 0.5 | 0.5 | 0.5 | 0.5 | 0.5 | 0.5 |
| | Antioxidant 2 | 0.5 | 0.5 | 0.5 | 0.5 | 0.5 | 0.5 | 0.5 | 0.5 | 0.5 | 0.5 | 0.5 | 0.5 |
| Evaluation | Uniformity | O | O | O | O | O | O | O | O | O | Δ | Δ | X |
| | Long-term thermal stability | O | O | O | O | O | O | O | O | X | X | X | X |
| | Coating ability | O | O | O | O | O | O | O | O | X | X | X | X |
| | Wet adhesive strength (N/cm) | 0.7 | 1.6 | 1.5 | 1.5 | 1.8 | 0.4 | 1.5 | 0 | 0.7 | 0.9 | 1.1 | — |
| | Dry adhesive strength (N/cm) | 4.0 | 3.8 | 4.1 | 4.0 | 4.1 | 3.8 | 4.0 | 3.8 | 3.2 | 2.6 | 2.9 | — |

TABLE 2

| | | Examples | | | | | | Comparative Examples | | | | | | |
|---|---|---|---|---|---|---|---|---|---|---|---|---|---|---|
| | | 8 | 9 | 10 | 11 | 12 | 13 | 6 | 7 | 8 | 9 | 10 | 11 | 12 |
| Composition (parts by mass) | Thermoplastic polymer 1 | 20 | 20 | 20 | 20 | 20 | — | 20 | 20 | 20 | 20 | 20 | 20 | — |
| | Thermoplastic polymer 2 | — | — | — | — | — | 20 | — | — | — | — | — | — | 20 |
| | Tackifier 1 | 59 | — | — | — | — | 50 | 59 | — | — | — | — | — | 60 |
| | Tackifier 2 | — | 55 | — | — | — | — | — | — | 60 | — | — | — | — |
| | Tackifier 3 | — | — | 55 | — | — | — | — | — | — | 60 | — | — | — |
| | Tackifier 4 | — | — | — | 55 | — | — | — | 59 | — | — | 60 | — | — |
| | Tackifier 5 | — | — | — | — | 55 | — | — | — | — | — | — | 60 | — |
| | Acid-modified tackifier 1 | 1 | — | — | — | — | 10 | — | — | — | — | — | — | — |
| | Acid-modified tackifier 2 | — | 5 | — | — | — | — | — | — | — | — | — | — | — |
| | Acid-modified tackifier 3 | — | — | 5 | — | — | — | — | — | — | — | — | — | — |
| | Acid-modified tackifier 4 | — | — | — | 5 | — | — | — | — | — | — | — | — | — |
| | Acid-modified tackifier 5 | — | — | — | — | 5 | — | — | — | — | — | — | — | — |
| | Acid-modified tackifier 6 | — | — | — | — | — | — | 1 | — | — | — | — | — | — |
| | Acid-modified tackifier 7 | — | — | — | — | — | — | — | 1 | — | — | — | — | — |
| | Softener 1 | 20 | 20 | 20 | 20 | 20 | — | 20 | 20 | 20 | 20 | 20 | 20 | — |
| | Softener 2 | — | — | — | — | — | 20 | — | — | — | — | — | — | 20 |
| | Antioxidant 1 | 0.5 | 0.5 | 0.5 | 0.5 | 0.5 | 0.5 | 0.5 | 0.5 | 0.5 | 0.5 | 0.5 | 0.5 | 0.5 |
| | Antioxidant 2 | 0.5 | 0.5 | 0.5 | 0.5 | 0.5 | 0.5 | 0.5 | 0.5 | 0.5 | 0.5 | 0.5 | 0.5 | 0.5 |
| Evaluation | Uniformity | ○ | ○ | ○ | ○ | ○ | ○ | ○ | ○ | ○ | ○ | ○ | ○ | ○ |
| | Long-term thermal stability | ○ | ○ | ○ | ○ | ○ | ○ | ○ | ○ | ○ | ○ | ○ | ○ | ○ |
| | Coating ability | ○ | ○ | ○ | ○ | ○ | ○ | ○ | ○ | ○ | ○ | ○ | ○ | ○ |
| | Wet adhesive strength (N/cm) | 0.6 | 1.6 | 1.1 | 2.0 | 1.4 | 1.3 | 0.2 | 0.2 | 0 | 0 | 0.1 | 0.1 | 0.1 |
| | Dry adhesive strength (N/cm) | 4.0 | 3.9 | 3.4 | 3.6 | 3.4 | 4.3 | 3.9 | 3.5 | 3.8 | 3.7 | 3.6 | 3.3 | 4.1 |

TABLE 3

| | | Examples | | | Comparative Examples | | |
|---|---|---|---|---|---|---|---|
| | | 14 | 15 | 16 | 13 | 14 | 15 |
| Composition (parts by mass) | Thermoplastic polymer 3 | 40 | 40 | 60 | 40 | 40 | 60 |
| | Tackifier 2 | 45 | — | — | 50 | — | — |
| | Tackifier 3 | — | 45 | — | — | 50 | — |
| | Tackifier 5 | — | — | 35 | — | — | 40 |
| | Acid-modified tackifier 2 | 5 | — | — | — | — | — |
| | Acid-modified tackifier 3 | — | 5 | — | — | — | — |
| | Acid-modified tackifier 5 | — | — | 5 | — | — | — |
| | Softener 1 | 10 | 10 | — | 10 | 10 | — |
| | Softener 2 | — | — | — | — | — | — |
| | Antioxidant 1 | 0.5 | 0.5 | 0.5 | 0.5 | 0.5 | 0.5 |
| | Antioxidant 2 | 0.5 | 0.5 | 0.5 | 0.5 | 0.5 | 0.5 |
| Evaluation | Uniformity | ○ | ○ | ○ | ○ | ○ | ○ |
| | Long-term thermal stability | ○ | ○ | ○ | ○ | ○ | ○ |
| | Coating ability | ○ | ○ | ○ | ○ | ○ | ○ |
| | Wet adhesive strength (N/cm) | 1.7 | 1.5 | 0.6 | 0.1 | 0.1 | 0 |
| | Dry adhesive strength (N/cm) | 4.9 | 4.2 | 3.2 | 4.7 | 4.0 | 3.2 |

As follows from Tables 1 to 3, hot-melt adhesives including a thermoplastic polymer, a tackifier, and a softener, with the tackifier including an acid-modified tackifier modified by anhydrous maleic acid and butyl methacrylate (Examples 1 to 16) were superior in uniformity, long-term thermal stability, coating ability, and wet adhesive strength to other hot melt adhesives (Comparative Examples 1 to 15). The hot melt adhesives of Examples 1 to 16 also had excellent adhesive strength in a dry state. More specifically, the hot melt adhesives of Examples 1 to 16 had a wet adhesive strength higher than that in Comparative Examples 1 and 8 to 15 that did not include the acid-modified tackifier as the tackifier. In the hot melt adhesives that did not include the acid-modified tackifier, but included the acid-modified wax (Comparative Examples 2 to 4), although the wet adhesive strength was somewhat increased, the long-term thermal stability was sometimes degraded. When the acid-modified wax was included in a comparatively large amount (Comparative Example 5), the coating ability or the like was too poor. Further, when the acid-modified tackifier was included, but this acid-modified tackifier was modified by anhydrous maleic acid, without being modified by a (meth)acrylic acid component (Comparative Examples 6 and 7), the wet adhesive strength sometimes could not be sufficiently increased.

Thus, it is clear that the hot melt adhesives of Examples 1 to 16 are superior in terms of wet adhesive strength or long-term thermal stability to the hot melt adhesives of Comparative Examples 2 to 7. Therefore, it is clear that the hot melt adhesives of Examples 1 to 16 excel in adhesiveness in a wet state and also in long-term thermal stability and coating ability.

Further, when the amount of the acid-modified tackifier was small (Examples 6 and 8), the wet adhesive strength was lower than in other Examples 1 to 5 and 7 to 16, but the wet adhesive strength was still higher than in Comparative Examples 1 and 8 to 15 in which no acid-modified tackifier was included. Thus, it is clear that even when the amount of the acid-modified tackifier is small, the acid-modified tackifier can demonstrate a sufficient effect of increasing the wet adhesive strength.

Where the acid-modified tackifier modified by anhydrous maleic acid and butyl methacrylate was included, even when the amount of the tackifier was small (Examples 6 and 8), the effect of increasing the wet adhesive strength could be demonstrated, as mentioned hereinabove. By contrast, when the acid-modified tackifier was included that was modified by anhydrous maleic acid, without being modified by the (meth)acrylic acid component (Comparative Examples 6 and 7), the wet adhesive strength was lower than in Examples 6 and 8 even when the amount of the acid-modified tackifier was the same. Thus, it is clear, that the acid-modified tackifier that is modified by anhydrous maleic acid, without being modified by the (meth)acrylic acid component, cannot demonstrate a sufficient effect of increasing the wet adhesive strength.

When the terpene-based resin was used as the pre-modified tackifier in the acid-modified tackifier (Examples 1 to 9, 13, and 14), the dry adhesive strength tended to be lower than that when the hydrogenated petroleum-based resin was used (Examples 10 to 12). Therefore, it is clear that when a terpene-based resin is used as the pre-modified tackifier in the acid-modified tackifier, the adhesiveness in a dry state is superior to that obtained when a hydrogenated petroleum-based resin is used.

This application claims priority to Japanese Patent Application No. 2014-31504 filed on Feb. 21, 2014, the contents of which are incorporated in the present application.

While the present invention was appropriately and sufficiently explained above based on the embodiments in order to represent the present invention, it should be recognized that a person skilled in the art can easily modify and/or improve the foregoing embodiment. Accordingly, as long as the modified mode or improved mode implemented by a person skilled in the art does not deviate from the scope of claims indicated in the claims, such modified mode or improved mode should be interpreted as being covered by the present scope of claims.

INDUSTRIAL APPLICABILITY

The present invention provides a hot melt adhesive that excels in adhesiveness in a wet state and also in long-term thermal stability and coating ability.

The invention claimed is:

1. A hot melt adhesive comprising a thermoplastic polymer and a tackifier, wherein
the tackifier includes an acid-modified tackifier that is modified by at least one of maleic acid and maleic anhydride, and by butyl methacrylate,
the acid-modified tackifier is a random or block copolymer having repeating units represented by Formula 1 below

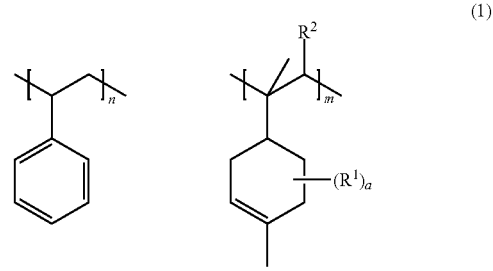

in Formula 1, $R^1$ and $R^2$ are independently a hydrogen atom or functional unit represented by Formula 2 below, a is 0 to 3, at least one among a plurality of $R^1$ and $R^2$ is the functional unit represented by Formula 2 below, the ratio of n in the total of n and m is from 0 or more to less than 1,

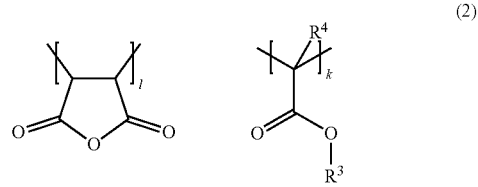

the functional unit represented by Formula 2 is a random or block copolymer having a repeating unit represented by Formula 2, $R^3$ in Formula 2 is butyl group, $R^4$ in Formula 2 is methyl group, and each of l and k is 1 or more.

2. The hot melt adhesive according to claim 1, wherein the thermoplastic polymer is a copolymer of a conjugated diene compound and a vinyl aromatic hydrocarbon.

3. The hot melt adhesive according to claim 2, wherein the copolymer is at least one selected from the group consisting of a styrene-butadiene block copolymer, a styrene-isoprene block copolymer, a hydrogenated styrene-butadiene block copolymer, and a hydrogenated styrene-isoprene block copolymer.

4. The hot melt adhesive according to claim 1, wherein an amount of the acid-modified tackifier is 0.1 mass % to 100 mass % based on a total amount of the tackifier.

5. The hot melt adhesive according to claim 1, wherein an amount of the thermoplastic polymer is 10 mass % to 75 mass %; and
an amount of the tackifier is 20 mass % to 80 mass %.

6. The hot melt adhesive according to claim 1, further comprising a softener.

7. The hot melt adhesive according to claim 6, wherein an amount of the softener is 5 mass % to 40 mass %.

* * * * *